W. I. STAAF & E. B. TYLER.
LIQUID METER.
APPLICATION FILED FEB. 3, 1912.
1,092,082.
Patented Mar. 31, 1914.
2 SHEETS—SHEET 1.
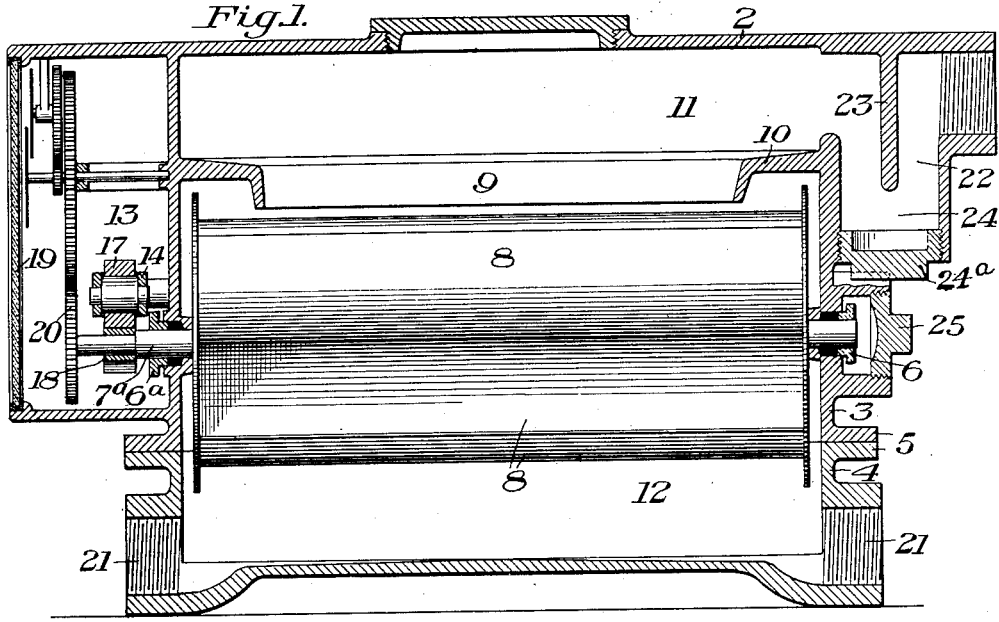
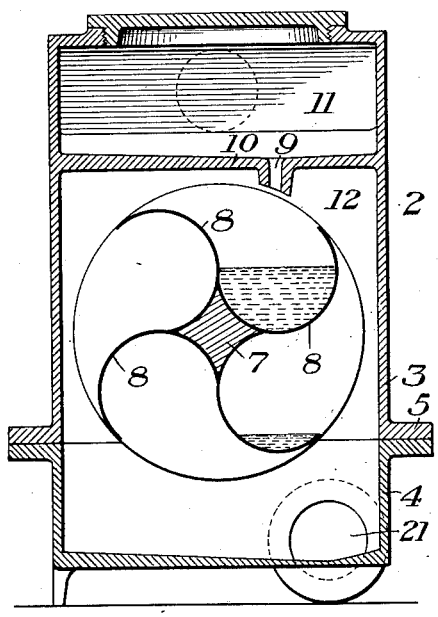
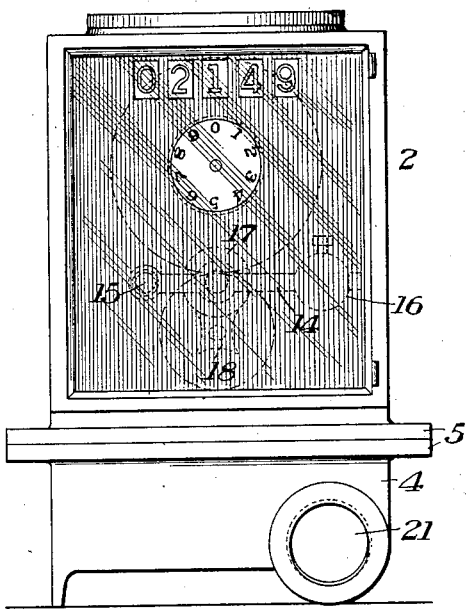
WITNESSES
INVENTORS

W. I. STAAF & E. B. TYLER.
LIQUID METER.
APPLICATION FILED FEB. 3, 1912.

1,092,082.

Patented Mar. 31, 1914.

2 SHEETS—SHEET 2.

WITNESSES

INVENTORS

UNITED STATES PATENT OFFICE.

WERNER I. STAAF AND EDWARD B. TYLER, OF PITTSBURGH, PENNSYLVANIA.

LIQUID-METER.

1,092,082.   Specification of Letters Patent.   Patented Mar. 31, 1914.

Application filed February 3, 1912. Serial No. 675,200.

*To all whom it may concern:*

Be it known that we, WERNER I. STAAF and EDWARD B. TYLER, both of Pittsburgh, Allegheny county, Pennsylvania, have invented a new and useful Liquid-Meter, of which the following is a full, clear, and exact description, reference being had to the accompanying drawings, forming part of this specification, in which—

Figure 4:
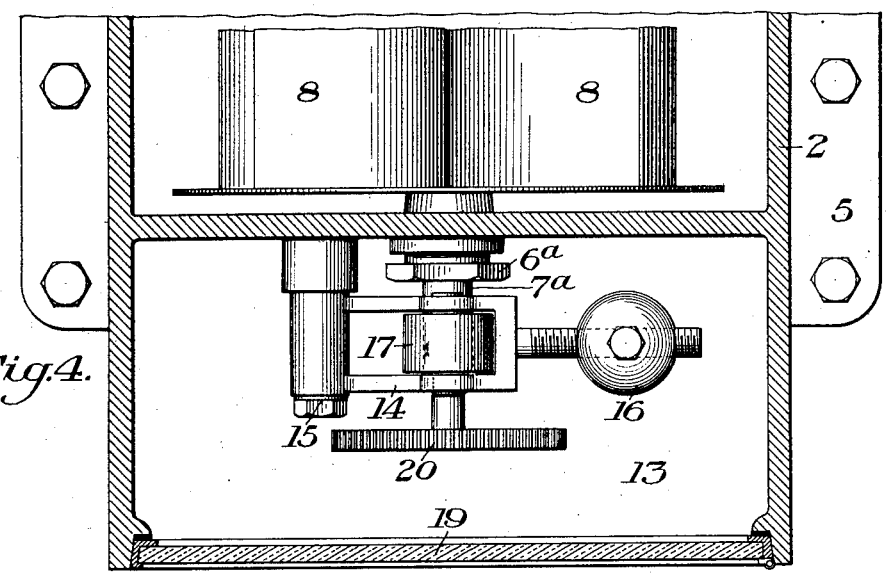
Figure 5:
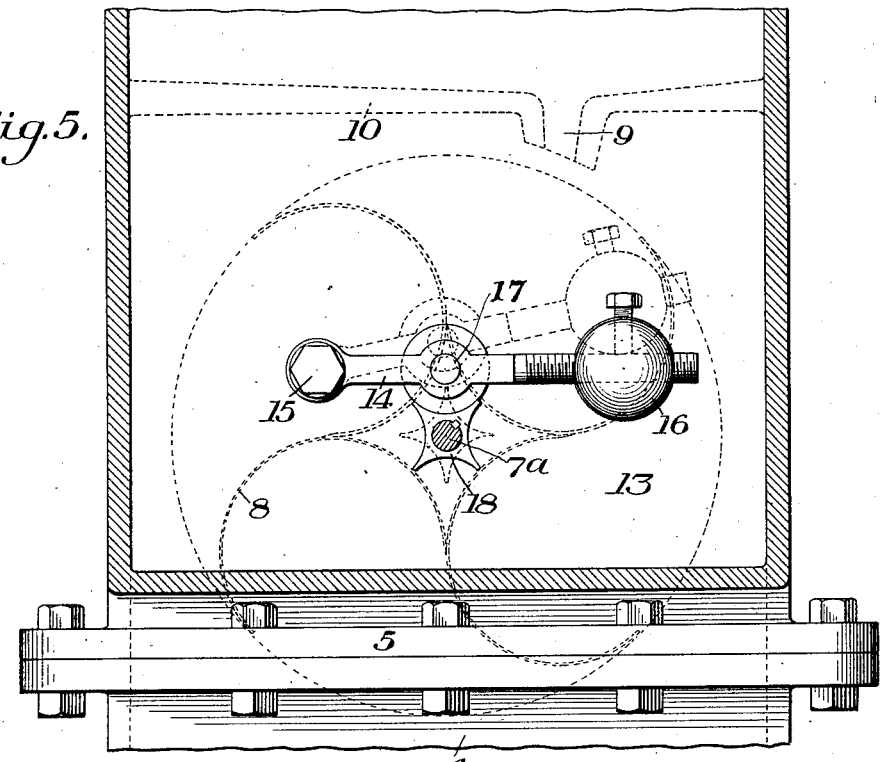

Figure 1 is a longitudinal vertical section showing one form of our improved meter; Fig. 2 is a cross-section of the same; Fig. 3 is an end elevation showing in dotted lines the device for giving intermittent movement; and Figs. 4 and 5 are sectional plan and elevation respectively, on a larger scale, illustrating the actuating mechanism.

Our invention relates to the class of liquid meters, and particularly those employed for measuring the amount of steam delivered by measuring the water condensed therefrom. It may, however, be applied to other purposes, and used wherever liquids are to be measured provided the quantities delivered per second are not too large.

Heretofore in this class of devices the meter has usually consisted of receptacles which oscillated in a see-saw movement, the filled receptacle moving downwardly and lifting up the empty receptacle, which movement shifted the feed gate or spout. These devices are noisy and objectionable. Our invention overcomes this difficulty, and provides an intermittent rotary meter which gives little or no noise and is highly efficient and accurate.

A further feature of the invention lies in arranging the outlets from the meter so that the meter will remain dry, in doing away with an inlet strainer, and in certain other features hereinafter more fully described and set forth in the claims.

In the drawings, 2 represents a casing, which may be made of any suitable material, such as cast iron, and is shown as made in two parts 3 and 4, united by flanges 5, which may be bolted together. The end walls of the body 3 are provided with bearings and stuffing boxes 6 and $6^a$ to contain the trunnions or shaft of the meter. This shaft 7 carries a number of curved blades 8, which act as receiving buckets, to which the water or liquid is supplied through an elongated downwardly lipped opening 9 extending longitudinally of the case and through the partition 10, which separates the receiving chamber 11 and the meter chamber 12. The shaft 7 is extended at one end through its stuffing box and bearing into a chamber 13 which contains a lever 14 pivoted at 15. An adjustable weight 16 is secured to this lever arm, and at an intermediate point the lever has a lateral pin carrying a steel antifriction roller 17. This anti-friction roller normally rests on a star wheel 18 secured to the end $7^a$ of the shaft 7, there being as many points to the star as there are rotary buckets. These parts are so arranged that when any bucket has received a predetermined amount of water—say one-half pound, the weight of this water will cause the star wheel to lift the lever 14 and the bucket will then drop, thus turning the shaft a part of a revolution. The steel roller will then at once drop into the next recess of the star wheel and thus lock the shaft until the next bucket has received the predetermined weight of water. An intermittent rotary movement is thus imparted to the meter shaft. We also preferably form the chamber 13 with a glass door or end 19, and provide at the end of the shaft 7 within this chamber a toothed wheel 20 intermeshing with suitable connecting gearing to actuate the dial mechanism.

In order to keep the meter dry and prevent collection of water therein, we preferably provide a bottom outlet or outlets 21, which are below the level of the buckets, and through which the water will be discharged as it is dropped by the succeeding buckets. These outlets prevent any collection of water within the meter. We show the casing as having two of the outlet connections 21—one at each end thereof. This enables the meter to be connected up to either a right hand or a left hand discharge pipe.

In order to avoid the use of a strainer at the inlet to the meter which requires cleaning and is likely to get out of order, we preferably provide an inlet chamber 22, which gives a tortuous course to the entering current. Thus, in the form shown, we provide a depending baffle partition 23, which causes the inflowing water to descend within the sediment chamber 24, and then rise on the other side of the wall 23 within the chamber 11. The bottom of the sediment chamber 24 is provided with a sealing plug $24^a$, which may be readily removed to take out sediment. We have shown a removable cover 25 below this plug to cover the stuffing box at this end of the meter shaft.

The advantages of our invention will be obvious to those skilled in the art, since the seesaw movement heretofore employed in intermittent liquid meters is done away with and an intermittent rotary movement provided which avoids the need for shifting the point of feed, reduces the noise, and increases the efficiency. The weight and star wheel system gives a simple and efficient means for providing the intermittent movement. The meter is free from water collecting therein, owing to the position of the outlets in the bottom below the level of the bucket path, and the need for an inlet strainer is avoided by reason of the inlet chamber having a sediment pocket.

All the adjustments of the meter may be made in the chamber 13 by merely opening the glass door thereof, so that the working parts are practically moisture and dust proof, as they are inclosed within a chamber through stuffing boxes in which a shaft extends. For the same purpose, the glass door of this chamber 13 is carefully fitted and sealed.

The provision of the receiving chamber 11 also constitutes an important feature of our invention. In the operation of these meters in measuring water of condensation, the flow of water through the meter is more or less irregular, depending upon the degree of condensation which has occurred in the steam system at any particular moment, and is often subject to quite large fluctuation. A sudden increase in the delivery of water would tend to cause the bucket wheel to spin unless means were provided to prevent this. The receiving chamber 11, together with the restricted opening 9, act as such means, since the chamber 9 forms a reservoir of sufficient capacity to take care of the fluctuations which occur, and the opening 9 is so proportioned that it cannot deliver a greater volume of water to the buckets than the latter are normally designed to handle.

Many changes may be made in the form and arrangement of the parts as herein shown and described, without departing from our invention as defined in the appended claims.

What we claim is:

1. A liquid meter, comprising a casing having a transverse horizontal partition across its interior and forming a storage chamber in the upper portion of the casing, said partition having therein a relatively narrow longitudinal discharge opening, a measuring wheel journaled transversely within the casing below the partition, and having a series of longitudinal buckets adapted each to receive and retain a definite predetermined weight of water discharged through said opening, and a weighted escapement device which acts upon said wheel to hold it against rotation until such time as the weight of water in a bucket reaches the predetermined limit, the casing having a water outlet below the wheel and adjacent the bottom wall of the casing, substantially as described.

2. A liquid meter, comprising a casing having a transverse horizontal partition across its interior and forming a storage chamber in the upper portion of the casing, said partition having therein a relatively narrow longitudinal discharge opening, a measuring wheel journaled transversely within the casing below the partition, and having a series of longitudinal buckets adapted each to receive and retain a definite predetermined weight of water discharged through said opening, and a weighted escapement device which acts upon said wheel to hold it against rotation until such time as the weight of water in a bucket reaches the predetermined limit, the casing having means for attaching a water outlet connection to either the right or the left hand end thereof below the said wheel; substantially as described.

In testimony whereof, we have hereunto set our hands.

WERNER I. STAAF.
EDWARD B. TYLER.

Witnesses:
R. A. BALDERSON,
GEO. B. BLEMING.

---

Copies of this patent may be obtained for five cents each, by addressing the "Commissioner of Patents, Washington, D. C."